3,332,985
12-OXO-15-OXY-A-NORPROGESTERONES
Patrick A. Diassi, Westfield, N.J., assignor, by mesne assignments, to E. R. Squibb & Sons, Inc., New York, N.Y., a corporation of Delaware
No Drawing. Filed May 12, 1965, Ser. No. 455,339
4 Claims. (Cl. 260—488)

This invention relates to and has for its object the provision of new physiologically active compounds, and more particularly, compounds of the formula

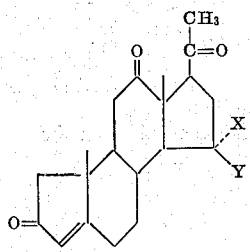

wherein Y is hydrogen; and X is selected from the group consisting of hydroxy and acyloxy.

The preferred acyl radicals of this invention are those of hydrocarbon carboxylic acids of less than twelve carbon atoms, as exemplified by the lower alkanoic acids (e.g., acetic, propionic, butyric and tert.-pentanoic acids), the lower alkenoic acids, the monocyclic aryl carboxylic acids (e.g., benzoic and toluic acids), the monocyclic aryl lower alkanoic acids (e.g., phenylacetic and β-phenylpropionic acids), the cycloalkane carboxylic and the cycloalkene carboxylic acids.

The novel compounds of this invention are pharmacologically active substances which possess anti-androgenic activity (i.e., they inhibit the actions of androgens), and which may be used in the treatment of such conditions as hyperandrogenic acne.

The compounds may be formulated for such adminstration, the concentration and/or dosage being based on the activity of the particular compound and the requirements of the patient.

To prepare the compounds of this invention, A-norprogesterone is first subjected to the action of enzymes of a microorganism of the genus Colletotrichum under oxidizing conditions. This oxidation can best be effected either by including A-norprogesterone in an aerobic culture of the microorganism, or by bringing together in an aqueous medium the compounds, air, and enzymes of non-proliferating cells of the microorganism.

In general, the conditions of culturing the Colletotrichum microorganism for the purposes of this invention are (except for the inclusion of A-norprogesterone to be converted), the same as those of culturing various other microorganisms for the production of antibiotics, Vitamin B-12, and other like substances. The microorganism is grown aerobically in contact with (in or on) suitable fermentation medium. A suitable medium essentially comprises a source of carbon and energy. The latter may be a carbohydrate, for example, molasses, glucose, maltose, starch or dextrin, a fatty acid, a fat and/or the compound itself. Preferably, however, the medium includes an assimilable source of carbon and energy in addition to the steriod. Among the fats utilizable for the purpose of this invention are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are stearic acid, palmitic acid, oleic acid, linoleic acid and myristic acid.

The source of nitrogenous factors utilizable for the purposes of this invention may be organic (e.g., soybean meal, cornsteep liquor, yeast extract, meat extract and/or distillers' solubles) or synthetic (i.e., composed of simple, synthesizable organic or inorganic compounds, such as ammonium salts, alkali nitrates, amino acids, or urea).

An adequate sterile air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of the concentration of the compound in the culture is about 0.01% to about 0.1%. The culture period (or rather the time of subjecting the compound to the action of the enzyme) may vary considerably, the range of about twenty-four hours to ninety-six hours being feasible, but not limiting.

The microbial process described hereinabove yields, inter alia, 12β,15α-dihydroxy-A-norprogesterone. The 12,15-dihydroxy derivative is then acylated as by treatment with an acylating agent, for example, an acid anhydride (i.e., acetic anhydride) or an acyl halide (e.g., acetyl chloride) in a basic medium (i.e., in pyridine) to yield the 12-hydroxy-15-acyloxy 12,15-diacyloxy derivative of the instant invention.

Alternatively, the 12-hydroxy-15-acyloxy derivatives of A-norprogesterones, which are new compounds of this invention, may be oxidized as by treatment with an oxidizing agent, for example, chromic acid to yield the 12-keto-15-acyloxy derivatives of A-norprogesterone which are also new compounds of this invention. These 12-keto-15-acyloxy compounds may then be hydrolized as by treatment with sodium methoxide to yield the 12-keto-15-hydroxy-A-norprogesterone new final products of the instant invention.

The invention may be illustrated by the following examples:

EXAMPLE 1

12β,15α-dihydroxy-A-norprogesterone

A 150 gallon fermentor containing 112 g. of A-progesterone in media containing corn steep liquor, $NH_4H_2PO_4$, $CaCO_3$, yeast extract, dextrose and soy bean oil is inoculated with aculture of Colletotrichum linicolae NCTC (National Collection of Type Cultures) No. 1194 (obtainable from the Commonwealth Mycological Institute, Kew, Surrey, England). After thirty-six hours, the whole broth is filtered and the filtrate extracted with one-half volume of chloroform in a Podbielniak extractor. The chloroform solution is washed with water, dried over sodium sulfate and evaporated to a crystalline mass. Trituration with 3×1000 ml. of hexane removes color and oil. The crude dry weight is 101.6 g. This material is recrystallized from acetone/hexane to give 67 g. of product which contains 11α,15α-dihydroxy-A-norprogesterone and 12β,15α-dihydroxy-A-norprogesterone.

The separation of these components is accomplished by column chromatography on 2300 g. alumina. Elution of the column with chloroform and continued elution with chloroform/methanol 200:1 and 100:1 gives 10.3 g. of 12β,15α-dihydroxy-A-norprogesterone having the following properties: M.P. 244–246° C.

$[\alpha]_D^{25} +40°$ 20.30 mg./2 ml. $CHCl_3$ $\lambda_{max}^{EtOH}$ 234 mμ; є max. 16,400 $\lambda_{max}^{Nujol}$ 2.89, 5.89, 6.00, 6.21, 7.92, 8.51, 9.39 and 11.73μ.

Analysis.—Calc'd for $C_{20}H_{28}O_4$ (332.42): C, 72.26%; H, 8.49%. Found: C, 72.29%; H, 8.58%.

EXAMPLE 2

12β,15α-dihydroxy-A-norprogesterone 15-acetate

A solution of 103 mg. of 12β,15α-dihydroxyprogesterone in 5 ml. of dry pyridine and 2 ml. of acetic anhydride is kept at room temperature for four hours, then diluted with ice water and extracted with chloroform. The chloroform is washed with water, 2 N HCl, and water, and evaporated to dryness. The residue is plate chromatographed on alumina (activity V) using chloroform as the developing solvent. Two bands are detectable by U.V. at $R_f$=0.6 and 0.3. The less polar band on elution with ethyl acetate, evaporation and crystallization from acetone-hexane gives 20 mg. of 12β,15α-diacetoxy-A-norprogesterone and the more polar band on similar work-up gives 70 mg. of 12β,15α-dihydroxy-A-norprogesterone 15-acetate having a melting point about 172–174° (another crystalline form melting at about 220–222° C. is also obtained), $[\alpha]_D^{26}$ +17.9° (chloroform), $\lambda_{max}^{alc.}$ 233 mμ (ε, 16,800), $\lambda_{max}^{Nujol}$ 2.92, 5.88, 6.18μ; $\tau_{CDCl_3}^{Si(Me)_4}$ 4.27 (S, 3–H)

5.02 (m, 15β–H), 5.14 (S, 12β–OH), 6.43 (d,d,5,9 c.p.s., 12α–H), 7.78 (S, 21–CH₃), 7.95 (S, 15–OAc), 8.81 (S, 19–CH₃), 9.17 (S, 18–CH₃).

*Analysis.*—Calc'd for $C_{22}H_{30}O_5$ (374.46): C, 70.56; H, 8.08. Found: C, 70.77; H, 8.28.

Similarly, following the procedure set forth in Example 2, but substituting an equivalent amount of propionic anhydride or benzoylchloride for acetic anhydride, there is obtained the respective 15-propionate and 15-benzoate derivatives of 12β,15α-dihydroxyprogesterone-A-norprogesterone.

EXAMPLE 3

15α-acetoxy-12-keto-A-norprogesterone

To a stirred solution of 100 mg. of 12β,15α-dihydroxy-A-norprogesterone 15-acetate in 10 ml. of reagent grade acetone, 0.9 ml. of an aqueous solution containing 20 mg. of chromic anhydride and 32 mg. of sulfuric acid per milliliter is added dropwise. After five minutes a few drops of methanol are added and the mixture diluted with water and extracted with chloroform. The chloroform is washed with water and evaporated in vacuo. Crystallization of the residue from acetone-hexane gives 86 mg. of 15α-acetoxy-12-keto-A-norprogesterone having a melting point about 168–170°; $[\alpha]_D^{22}$ +105° (chloroform), $\lambda_{max}^{alc.}$ 232 mμ (ε, 17,000), $\lambda_{max}^{Nujol}$ 5.73, 5.81, 5.86, and 6.13μ; $\tau_{CDCl_3}^{Si(Me)_4}$ 4.23 (S, 3–H), 4.90 (15β–H), 7.73 (S, 21–CH₃), 7.99 (S, 15α–OAc), 8.73 (S, 19–CH₃), 8.91 (S, 18–CH₃).

*Analysis.*—Calc'd for $C_{22}H_{28}O_5$ (372.44): C, 70.94; H, 7.58. Found: C, 70.95; H, 7.72.

EXAMPLE 4

12-keto-15α-hydroxy-A-norprogesterone

A solution of 12-keto-15α-acetoxy-A-norprogresterone in 0.1 N sodium methoxide is refluxed under nitrogen for one hour. The green solution is then cooled, neutralized with dilute acetic acid, diluted with 100 ml. water, and partially evaporated in vacuo. It is then diluted further with 100 ml. water, and extracted with chloroform. The chloroform extract is washed with water and evaporated. Crystallization of the residue from acetone-hexane gives 12-keto-15α-hydroxy-A-norprogesterone having a melting point about 262–264° C., $\tau_{CDCl_3}^{Si(Me)_4}$ 4.20 (S, 3–H)

7.73 (S, 21–CH₃), 8.72 (S, 19–CH₃), 8.94 (S, 18–CH₃).

*Analysis.*—Calc'd for $C_{20}H_{26}O_4$ (330.41): C, 72.70; H, 7.93. Found: C, 72.74; H, 7.99.

The invention may be variously otherwise embodied within the scope of the appended claims.

What is claimed is:

1. A compound selected from the group consisting of steroids of the formula

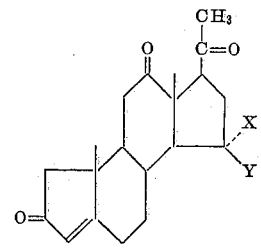

wherein Y is hydrogen and X is selected from the group consisting of hydroxy and acyloxy; wherein the acyl radical is of a hydrocarbon carboxylic acid of less than twelve carbon atoms.

2. 12β,15α-dihydroxy-A-norprogesterone 15-acetate.
3. 15α-acetoxy-12-keto-A-norprogesterone.
4. 12-keto-15α-hydroxy-A-norprogesterone.

References Cited

UNITED STATES PATENTS

| | | | |
|---|---|---|---|
| 3,170,919 | 3/1965 | Fried | 260—488 |
| 3,179,698 | 4/1965 | Weisenborn et al. | 260—586 |

OTHER REFERENCES

Schubert et al., Leitschrift fur Naturforschung, vol. 17b, No. 7, July 1962, pp. 436–439.

LORRAINE A. WEINBERGER, *Primary Examiner.*

VIVIAN GARNER, *Assistant Examiner.*